E. HOLMES.
WIRE TIE.
APPLICATION FILED AUG. 30, 1920.
1,421,781.
Patented July 4, 1922.
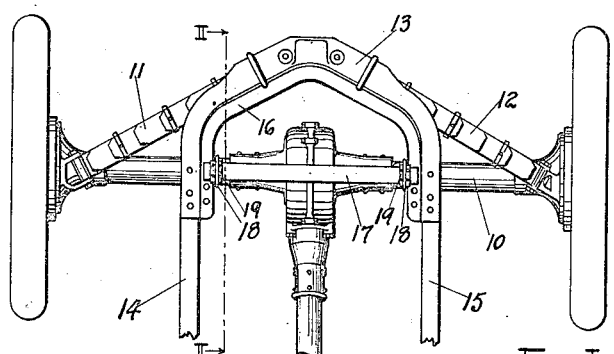
Fig. I.
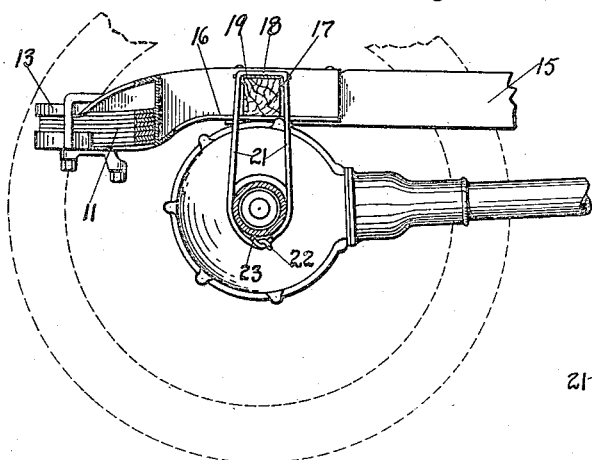
Fig. II.
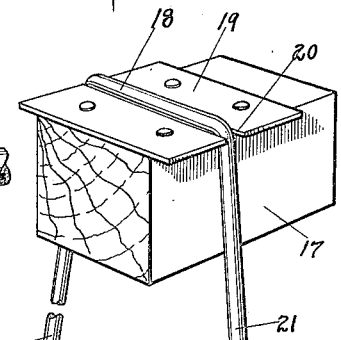
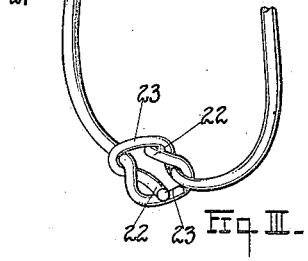
Fig. III.
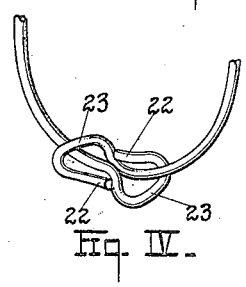
Fig. IV.
INVENTOR.
Edward Holmes
BY Chester W. Braselton
Harry W. Lindsey Jr.
ATTORNEYS.

UNITED STATES PATENT OFFICE.

EDWARD HOLMES, OF TOLEDO, OHIO.

WIRE TIE.

1,421,781.  Specification of Letters Patent.  Patented July 4, 1922.

Application filed August 30, 1920. Serial No. 407,022.

*To all whom it may concern:*

Be it known that I, EDWARD HOLMES, residing at Toledo, county of Lucas, State of Ohio, have invented certain new and useful Improvements in Wire Ties, of which I declare the following to be a full, clear, and exact description.

This invention relates to means for holding compressed the springs of automobiles, and also to a particular kind of tie forming the holding element for said means, as well as to the particular automatically engaging and disengaging joint for the ends of said tie, which joint is capable of more or less general application.

One object of the invention is the provision of means for holding compressed the springs of automobiles during shipment thereof upon freight cars or the like, which means shall be quickly and easily locked in operative position and as easily disengaged and which shall be extremely inexpensive to manufacture.

Another object of the invention is the provision of a tie having a pair of arms provided with interlocking means which are engageable and disengageable automatically merely by the application of pressure in a proper direction to the arm.

A further object is the provision of a particular automatic interlocking means for the above purpose and for other applications where the quick and easy engagement and disengagement of wire terminals is desirable.

Other objects, and objects relating to details of construction and economies of manufacture, will appear as I proceed with the description of that embodiment of the invention which, for the purposes of the present application, I have illustrated in the accompanying drawing, in which:

Figure I is a plan view of one end of the chassis of an automobile in connection with which my invention is employed.

Figure II is a view partly in elevation and partly in section on the line II—II, Figure I.

Figure III is a fragmental perspective view showing a metal tie in place upon a transverse connecting member carried by the automobile frame.

Figure IV is a detail of the automatic interlocking means, here shown about halfway between its engaged and disengaged positions.

Similar reference characters refer to like parts throughout the views.

In the drawing, 10 represents one of the axles of an automobile upon the extremities of which are pivoted springs 11 and 12 secured at their inner ends to a yoke 13 which forms the transverse connection between the side members 14 and 15 of the automobile frame.

The yoke 13 includes an inwardly extending flange 16 of which use is made in the present instance as a support for the end of a bar 17, preferably of wood, upon which the tie 18 is hung. Some means is preferably provided for preventing longitudinal movement of the tie 18 upon the bar 17 and, as shown in the drawing, this means may take the form of a metal plate 19 suitably fastened to the bar and provided with notches 20 for the reception of the arms 21 of the tie. This means for supporting the ties 18 is a convenient one for the type of frame shown, but it will be readily appreciated that the tie may be hung from the frame in various other ways without departing from the spirit of the invention.

The terminals of the arm 21 are preferably sprung apart slightly and have their extreme ends 22 bent backwardly parallel with the main portions of the arms but separated therefrom by a distance at least equal to the diameter of the wire. Between each main arm and its parallel end portion is a loop 23, the inside, transverse dimension of which is equal at least to three times the diameter of the wire in order that the main portion of the other arm and its parallel rebent end may lie within said loop.

Each loop 23 is bent so that its plane lies at an angle to the plane through the corresponding end 22 and the main portion of the arm. The planes of the two loops, as they approach each other closely, are substantially parallel. When the arms 21 are entirely disengaged, the loops 23 lie face to face and the end 22 of one terminal is in substantially the same plane as the main portion of the opposite arm. As the operator grasps the arms 21 of the tie and presses them together both longitudinally and laterally, the loops slide upon each other laterally and longitudinally until the parts take the position illustrated in Figure IV whereupon the release of pressure upon the arms 21 permits them to move because of their own resilience outward both longitudinally and laterally until they interlock as shown in Figure III. Disengagement of the connection is accomplished by the reverse of these operations.

I am aware that the details of my invention as illustrated in the accompanying drawing and described in the foregoing specification are susceptible of various modifications without departing from the spirit of my invention, and therefore I desire to claim my invention broadly as well as specifically as indicated in the appended claims.

Having thus described my invention, what I claim as new and desire to secure by Letters Patent, is:

1. Means for holding compressed the springs of an automobile, comprising an element carried by the frame of the automobile, a holder made of resilient metal, adapted to bear upon the top of said element and having sides extending downwardly upon the opposite sides of the automobile axle, the ends of said holder being bent toward each other beneath the axle and provided with interlocking means adapted to be automatically engaged by pressure of the said ends together.

2. Means for holding compressed the springs of an automobile comprising an element carried by the frame of the automobile, a holder made of resilient metal adapted to bear upon the top of said element and having sides extending downwardly upon the opposite sides of the automobile axle, the ends of said holder being bent towards each other beneath the axle and provided with interlocking means adapted to be automatically engaged by pressure of said ends together, said means being adapted to be disengaged by pressure of said ends together longitudinally and laterally simultaneously.

3. Means for holding compressed the springs of an automobile, comprising an element carried by the frame of the automobile, a holder made of resilient metal adapted to bear upon the top of said element and having sides extending downwardly upon opposite sides of the automobile axle, the ends of said holder being bent towards each other and provided with interlocking means adapted to be automatically engaged by pressure of said ends together, and means for preventing movement of said holder upon said element.

4. In an automobile, an axle, a frame, springs supporting said frame upon said axle, an element carried by the frame above said axle, a holder made of resilient metal extending around said element and axle to constitute a compressing tie against the action of said springs, the ends of said holder being provided with interlocking means adapted to automatically engage by pressure of said ends together.

5. In an automobile, an axle, a frame, springs supporting said frame upon said axle, an element carried by the frame above said axle, a holder made of resilient metal extending around said element and axle to constitute a compressing tie against the action of said springs, the ends of said holder being provided with interlocking means adapted to automatically engage by pressure of said ends together, said means being adapted to be disengaged by pressure of said ends together longitudinally and laterally simultaneously.

6. In an automobile, an axle, a frame, springs supporting said frame upon said axle, a holder made of resilient metal supported by said frame and extending around said axle to constitute a compressing tie against the action of said springs, the ends of said holder being provided with interlocking means adapted to automatically engage by pressure of said ends together.

7. In an automobile, an axle, a frame, springs supporting said frame upon said axle, a holder made of resilient metal supported by said frame and extending around said axle to constitute a compressing tie against the action of said springs, the ends of said holder being provided with interlocking means adapted to automatically engage by pressure of said ends together, said ends being adapted to be disengaged by pressure of said ends together longitudinally and laterally simultaneously.

In testimony whereof, I affix my signature.

EDWARD HOLMES.